United States Patent

Neugebauer et al.

[11] Patent Number: 5,897,004
[45] Date of Patent: Apr. 27, 1999

[54] PRODUCT CARRIER FOR USE DURING INTERNAL TRANSPORT AND TREATMENT OF GARMENTS AND METHOD FOR SAME

[75] Inventors: Karl Neugebauer, Borås, Sweden; Anders L. Hansen, Charlotte, N.C.

[73] Assignee: AB Metric Interconveyor, Sweden

[21] Appl. No.: 08/913,607

[22] PCT Filed: Mar. 18, 1996

[86] PCT No.: PCT/SE96/00338

§ 371 Date: Jan. 7, 1998

§ 102(e) Date: Jan. 7, 1998

[87] PCT Pub. No.: WO96/29267

PCT Pub. Date: Sep. 26, 1996

[30] Foreign Application Priority Data

Mar. 21, 1995 [SE] Sweden .................................. 9500980

[51] Int. Cl.[6] ...................................................... A47F 5/00
[52] U.S. Cl. .......................................... 211/162; 211/113
[58] Field of Search .................................. 211/162, 123, 211/124, 113, 118, 122

[56] References Cited

U.S. PATENT DOCUMENTS 3,785,474  1/1974  Nakamoto ........................... 211/122 X
3,921,814  11/1975 Solomon ................................. 211/162
4,664,267  5/1987  Clark .................................. 211/162 X
5,076,446  12/1991 Simmerman et al. ............. 211/123 X

FOREIGN PATENT DOCUMENTS 38 34 576 C2   7/1990   Germany .

*Primary Examiner*—Robert W. Gibson, Jr.
*Attorney, Agent, or Firm*—Lerner, David, Littenberg, Krumholz & Mentlik, LLP

[57] ABSTRACT

The invention relates to an apparatus for transporting product carriers comprising hangers for carrying products, a loading station for loading the hangers in product carriers including a slot for insertion of the hangers and a pivotable spring-loaded lock for locking the hangers in the slot of the product carrier, a buffer station from which hangers are transported to the loading station, a carrier station from which product carriers are transported to the loading station, means for inserting hangers in the slot at the loading station so that the hangers are locked in the slot and carried by the product carrier, control means for guiding the movement of the product carriers in the apparatus and for releasing the lock from the locking position so that the hangers are released at a predetermined point in the apparatus. The product carrier and a method for transporting hangers are also disclosed.

21 Claims, 3 Drawing Sheets

PRODUCT CARRIER FOR USE DURING INTERNAL TRANSPORT AND TREATMENT OF GARMENTS AND METHOD FOR SAME

TECHNICAL AREA

The present invention relates to a product carrier for use during internal transport and the treatment of garments in, for example, laundries, whereby the garments are hung up on hangers at a hanging station and moved forward on a rail. The product carrier is carried by the rail and the hangers are hung up into this and not onto the rail. The invention also relates to a method for internal transport of hangers.

PRIOR ART

In laundries and similar arrangements where garments and clothes are to be treated the garments or the clothing are usually hung up on a hanger, either at the beginning of the treatment or at a stage during the treatment, for example after the washing and drying. The hanger in its turn is hung up onto a transport arrangement, comprising a product carrier and a rail or the like. The hangers are transported to further treatment stations, such as "finishing treatments", comprising steamwetting of the clothes, blowing of the clothes to straighten out creases etc., and finally to the sorting and packing station for delivery to the customers.

In large laundries which, for example, wash garments for hospitals, larger companies and the like a very large number of garments are washed every day. These garments shall be subjected groupwise to different treatment and they shall also be sorted in different groups for different customers. To enable this to be done quickly, easily and without excessive costs or errors, electronics have been used and the movement of the garments is guided after the washing and the drying on the transport rail by means of a guiding system, for example a computer. One condition for the transport of the hangers to be able to be guided by a computer to the different treating stations and unloading stations is that the computer knows which garments are present on the transport track and where they are to be transported. The hangers are usually hung up in a product carrier which moves on the rail and both the hangers and the product carrier are therefore in most, or at least in some cases, marked in some way so that they can be identified by the computer or information regarding the hanger and the product carrier is manually entered into the computer so that it knows the position of the hanger.

Hangers, product carriers and garments can be marked with bar codes or even with a radio frequency identification or the like. The garments belonging to large customers are advantageously usually marked once and for all and the marking comprises identification of the customer, what article is marked, which person in the client company uses the article, etc. The marking can comprise only one or a few details of such information. The garments may also be completely unmarked. The marking which then further is needed to enable the computer to guide the garment is then mostly carried out manually at the hanging station.

An example of an apparatus of prior art is disclosed in DE-A-3 834 576

THE TECHNICAL PROBLEM

Systems such as those described above usually work well and they do not require too much manual work. However, some manual handling occurs, especially in relation to hanging up all the hangers provided with the garments into the product carrier and removing these hangers at the end station. An automatic method and an automatic arrangement for carrying out these operations have therefore long been desireable.

THE SOLUTION

According to the present invention a product carrier for use during internal transport of hangers in, for example, laundries has been brought about, which product carrier comprises an elongated rigid element, for example a rod, having suspending arrangements in the shape of rolls or the like intended to hang on a rail and which carries a fastening device for a hanger, which product carrier is characterized in that the fastening device comprises a slot which in the hanging position of the product carrier is downwardly open for insertion of a hanging hook of a hanger, and a pivotable lock in the slot, which lock is intended to lock and carry the hanging hook of a hanger in the slot, which lock is spring-loaded in its locking position and arranged to be released by a depressable spring-loaded pin.

According to the invention, it is preferred that the fastening device consists of two disc-shaped elements united at their upper parts and forming the slot at their lower parts.

According to the invention the lock is preferably pivotably mounted in one of the disc-shaped elements at its lower part and may have an oblique surface inwardly toward the slot against which surface the hanger hook is intended to slide during its insertion and push the lock backward.

According to the invention it is preferred that the oblique surface transforms in a "shelf" on the lock which shelf is intended to carry the hanger hook after the insertion thereof.

According to the invention the lock co-operates preferably at its upper part with a pressure spring which presses the lock outward/forward.

To release the lock the displaceable spring loaded pin, according to the invention, has preferably an oblique axial surface which on displacement of the pin co-operates with a surface on the lock for displacement inward/backward to release position for the lock.

The invention also comprises use of the invented product carrier for internal transport and treatment of garments in, for example, laundries whereby the garments are hung up on hangers in a hanging station, which hangers are moved on from there suspended from a rail or the like and the garments, which are marked with a bar code, radio frequency identification or the like, are read by a reading device at the hanging station and are registered in a computer, or garments which are not marked are manually registered in the same computer whereupon the hangers are hung up in a moveable and marked product carrier on the rail which is registered by the computer, whereupon the product carrier is moved forward on the rail under computer guidance and that the hanger is automatically released from the product carrier at a point which is determined by the computer and which is characterized in that the hanger is hung up automatically from below into the slot in the product carrier according to the invention.

According to the invention the registration of the garment and the product carrier is preferably combined in the computer.

The combined registration of the garments and the product carrier in the computer constitutes, according to the invention, is preferably a basis for the guidance of the product carrier by the computer.

FIGURE DESCRIPTION

The invention will in the following be described more in detail in connection with the attached figures where FIG. 1 schematically shows the suspension of the hanger provided with a garment in the product carrier, where FIG. 2 schematically shows the removal of the hanger provided with a garment from the product carrier to a separate rail, where FIG. 3 shows the two discshaped elements of the product carrier and a vertical section through the combined product carrier with inserted hanger hook.

DETAILED DESCRIPTION

Figure 1:
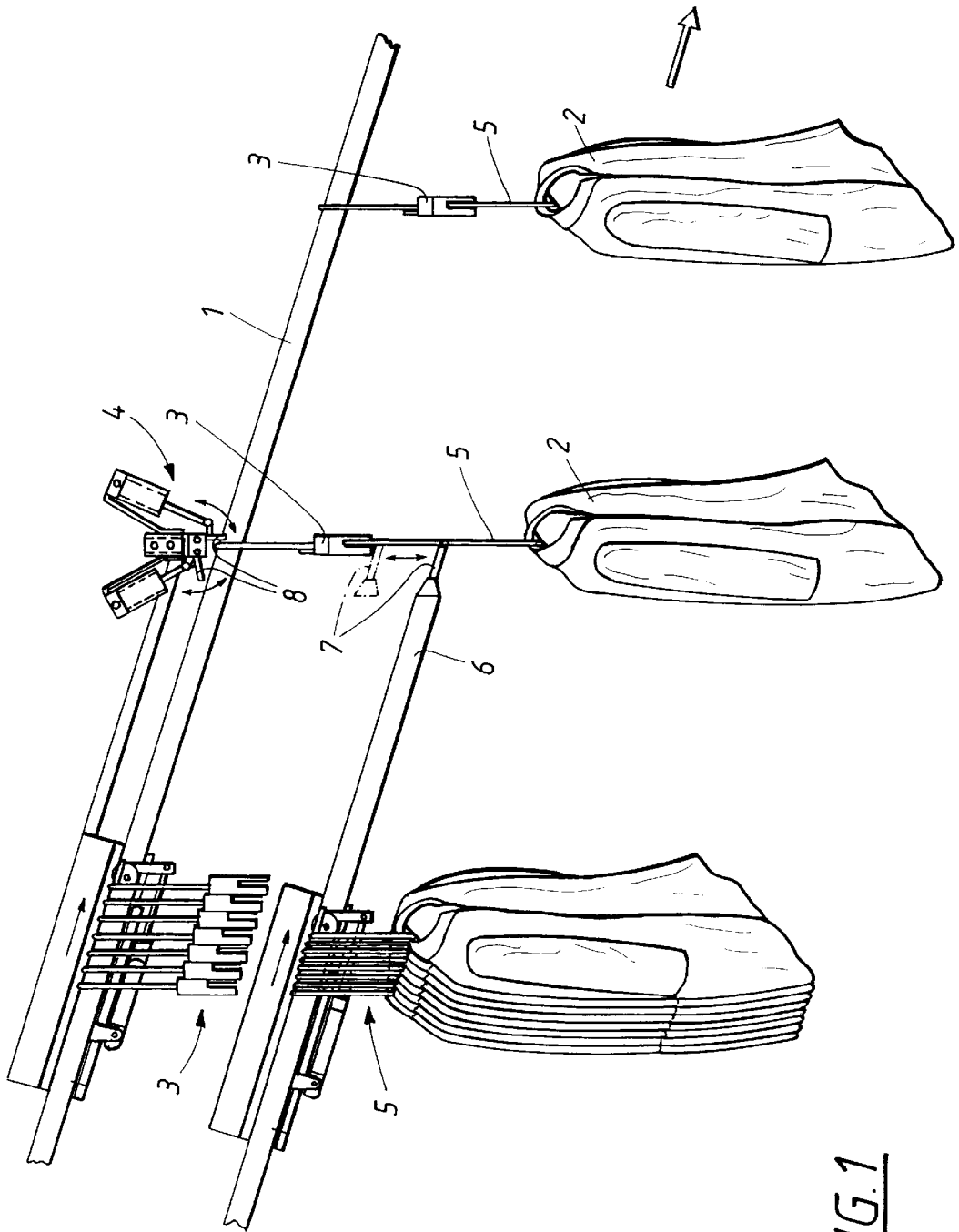

A main transport rail 1 in a laundry for transport of garments which shall be further treated after washing and delivered to a predetermined position is shown on FIG. 1. This rail 1 is, in the present case, made sloping but it may also be horizontal or incline upwardly depending on the circumstances. In the present case a station for the product carriers 3 has been arranged which station is intended to deliver the product carriers 3 one by one down to a loading station 4 where hangers 5 provided with garments 2 shall be pushed from below into the product carrier 3. The hangers 5 come from a buffer station from which they are brought forward one by one to a point directly underneath the loading station 4. The hanger 5 is on a rail 6 and this rail 6 has at its end an arrangement 7 for lifting the hanger 5 into the product carrier 3. This lifting arrangement 7 can be of any kind and is not described further here.

As shown in the drawing, the hanging station 4 comprises two flaps 8. They are pivotably suspended and can be operated by air pressure cylinders or the like. In the drawing one of the flaps is shown lowered, in which position it will be maintained when the product carrier 3 reaches the station 4 and is stopped by this flap 8. Thereafter, the product carrier is locked by the second flap 8 being swung downwardly and pressed against the hook of the product carrier 3. A locking in this position of the product carrier 3 is necessary to make it possible for the hanger 5 to be pushed upwardly into it without it swinging to the side or lifting. After the hanger 5 has been pushed up into the product carrier 3 it is then carried forward in a way known per se in the direction of the arrow.

Figure 2:
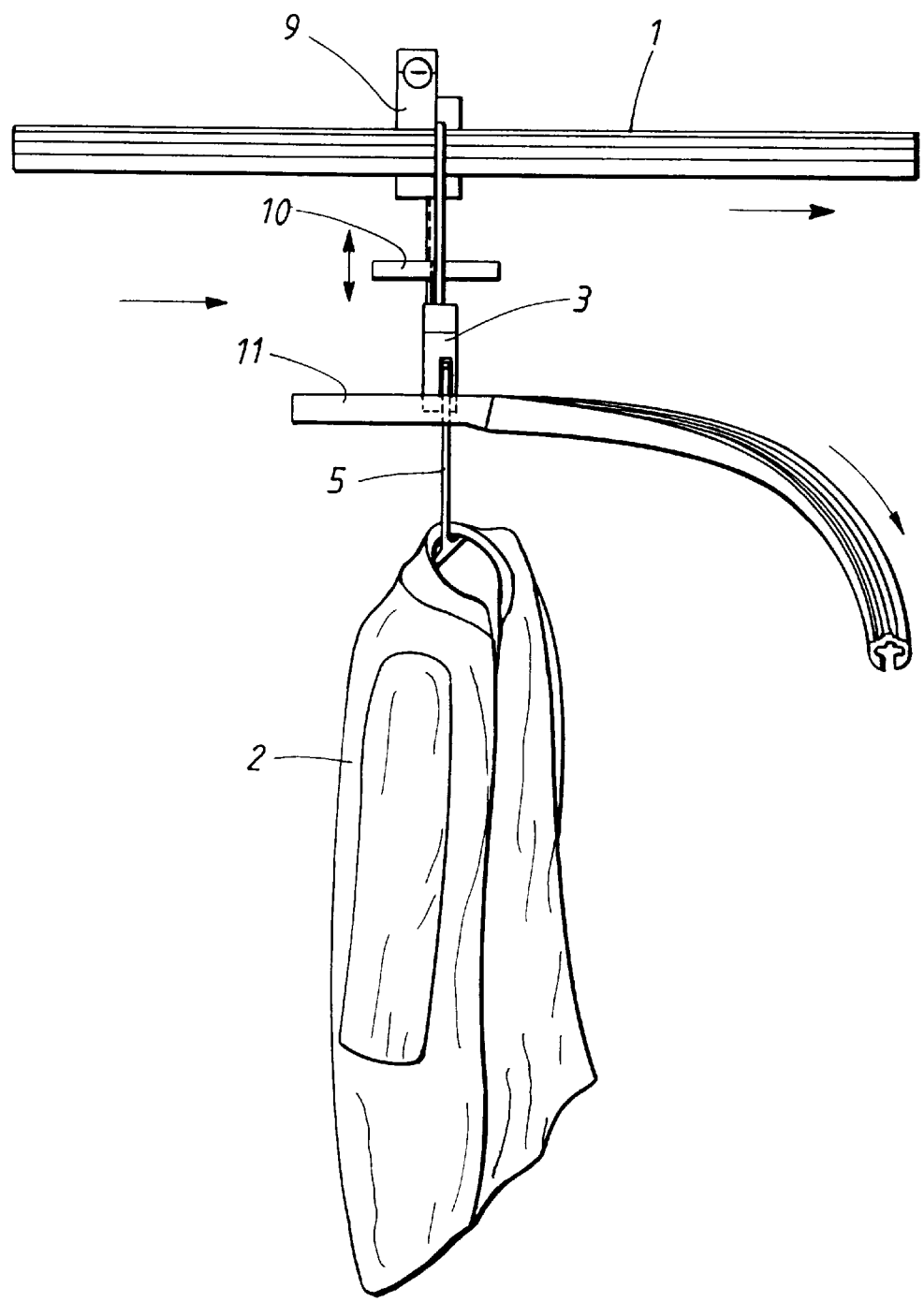

FIG. 2 shows the end station for the movement of the garment 2 on the rail 1. The rail 1 is endless but this end station is marked by a release station 9. When the product carrier 3 has come to the release station 9 the computer will know this and it knows that the hanger 5 shall be released. The release station 9 comprises an up- and downwardly moving disk or the like which, when releasing shall occur, presses against a releasing pin on the product carrier 3, which shall be described in more detail below. Under this station 9 a new rail 11 has arrived and it receives the hanger 5 which is dropped down on this rail. This rail 11 is shown swung to the side to the right but it can also be swung sidewardly to the left. Different rails 11 may be displaceable sidewardly for receiving hangers 5. The product carrier 3 moves on after the removal on the rail 1 without the hanger 5.

Figure 3:
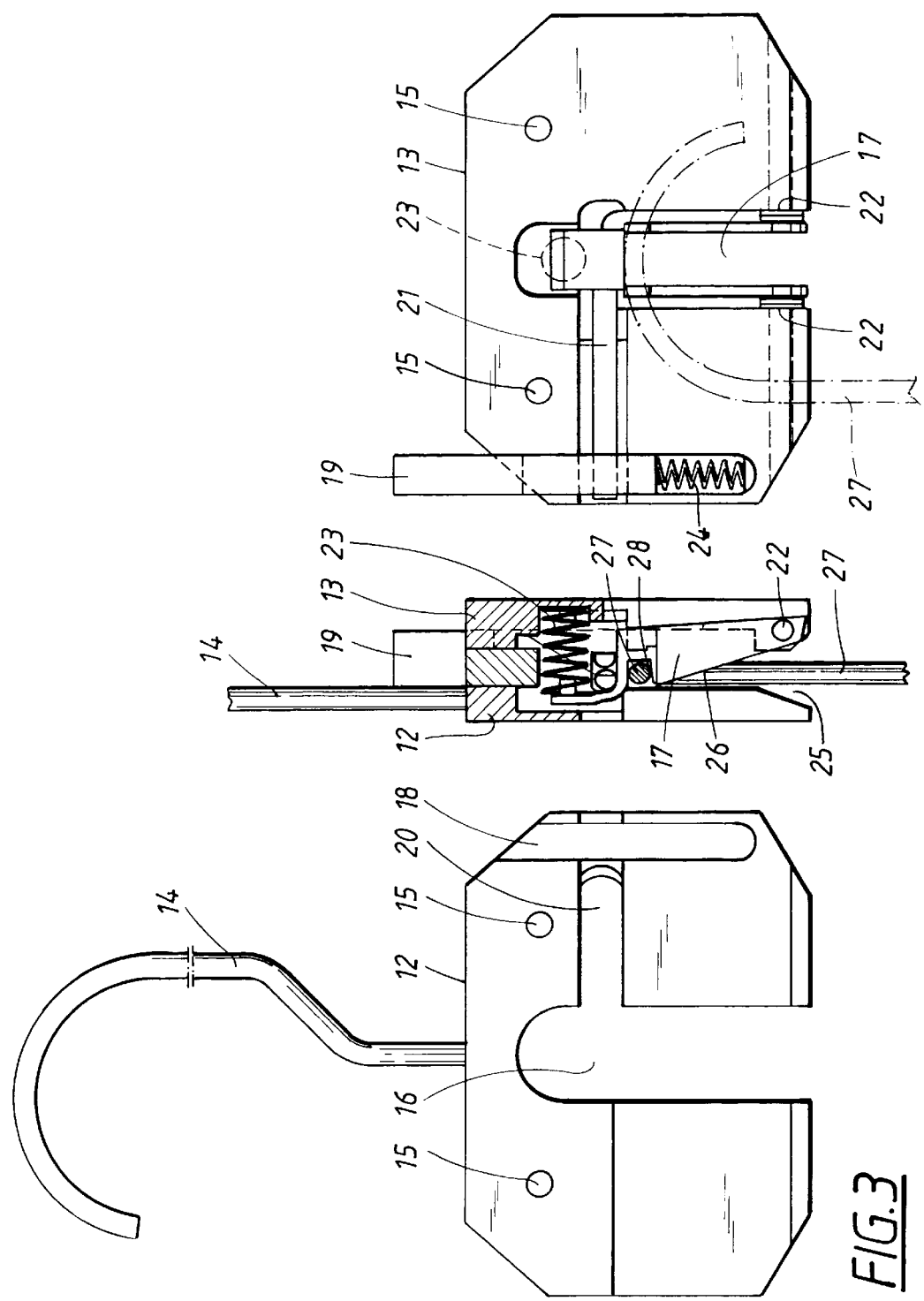

In FIG. 3 the two disc-shaped elements which are a part of the product carrier 3 are shown. To the left the front element 12 is shown and to the right the rear element 13. On the front element 12 the suspension hook 14 is mounted. The two elements 12 and 13 can be united by, for example, screws 15. In the left front part an opening 16 from below is made, which opening is intended to accommodate the lock 17 mounted on the second rear disc 13. This opening 16 is accordingly not the slot mentioned earlier. In the front part 12 a groove 18 for the releasing pin 19 is arranged and a channel 20 from the groove 18, which channel 20 is intended for an arm 21 which protrudes horizontally from the lock 17.

On the disc 13 to the right in FIG. 3 it is shown how the lock 17 is pivotably mounted on axes 22 at the lower part of the disc 13. At the upper part of the lock 17 a pressure spring 23 is arranged which, on the right part of FIG. 3 is shown hidden by the lock 17 itself, but which is shown better on the intermediate part between the discs. Further, on the right part of FIG. 3 the spring 24 is shown, which can be pushed in by the displacement pin 19.

On the intermediate part between the discs 12 and 13 in FIG. 3 it is shown how these have been united and form a lower slot 25. The lock 17 has, as it is shown, an oblique front surface 26. When the hanging hook 27 of the hanger 5 is pushed upwardly into the slot 25 it will slide against the surface 26 and push the lock 17 backwardly against the spring force from the spring 23. When the hanger hook 27 has reached the upper part of this surface 26 the lock 17 is snapped back to its original position and the hanger hook 27 is received on a shelf 28. It will then be hanging on this shelf 28 and locked between the parts 12 and 13.

When the hanger 5 with its hanger hook 27 shall be released the pin 19 is pushed downwardly by means of some device, for example the disc 10 which is shown in FIG. 2. The pin 19 has an oblique axial surface which faces the rear disc 13 and which abuts against the arm 21 of the lock 17. When the pin 19 is pushed downwardly against the spring 24, the arm 21 and the lock 17 will, due to this oblique surface, be pushed backwardly so that the hanger hook 27 falls down.

By the arrangement according to the present invention both an automatic lifting-up of the lower hanger with its garment and an automatic releasing of the same hanger with its garment will be obtained at a point along the track which is predetermined by the computer and which is controlled by this together with the coding on the product carrier and the hanger.

The invention is not limited to the embodiment shown but can be varied in different ways within the scope of the claims.

We claim:

1. A product carrier for transporting a hanger, comprising an elongated rigid element, a fastening device on said elongated rigid element for carrying said hanger, and means for transporting said rigid element, said fastening device comprising a housing having a downwardly open slot for insertion of said hanger and a pivotable lock mounted in said slot and pivotable between a locking position and a release position, said pivotable lock spring-loaded in said locking position for locking said hanger in said slot, said lock including release means for pivoting said lock into said release position from said locking position and releasing said hanger from said product carrier.

2. The product carrier of claim 1, wherein said release means comprises a pin movable between a first position and a second position, said pin being spring-loaded in said first position, whereby upon moving into said second position said pin pivots said lock into said release position.

3. The product carrier of claim 1, wherein said housing comprises a first disc-shaped element and a second disc-shaped element, each of said first and second disc-shaped element having an upper part and a lower part, said upper part of said first disc-shaped element being joined to said upper part of said second disc-shaped element and said lower parts of said first and second disc-shaped elements forming said slot.

4. The product carrier of claim 3, wherein said lock is pivotably mounted on said lower end of said first disc-shaped element in said slot and includes an oblique surface facing said lower ends of said first and second disc-shaped elements so that said hanger inserted upwardly into said slot engages said oblique surface at said bottom portion and moves said lock from said locking position to said release position for receiving said hanger in said fastening device.

5. The product carrier of claim 4, wherein said lock includes an upper portion forming a shelf adjacent said oblique surface so that said lock is returned to said locking position when said hanger engages said shelf, said shelf supporting said hanger thereon when said lock is returned to said locking position.

6. The product carrier of claim 5, wherein said lock is spring-loaded in said locking position by a pressure spring.

7. The product carrier of claim 2, wherein said lock includes an arm and said pin includes an oblique axial surface whereby when said pin is moved into said second position said oblique axial surface contacts said arm and thereby pivots said lock into said release position.

8. A product carrier transporting apparatus, comprising:
a) a plurality of hangers for carrying products;
b) a plurality of product carriers, each of said product carriers including a housing having a downwardly open slot for insertion of one of said hangers and a pivotable lock mounted in said slot and pivotable between a locking position and a release position, said pivotable lock spring-loaded in said locking position for locking said hanger in said slot, said lock including release means for pivoting said lock into said release position from said locking position and releasing said hanger from said product carrier;
c) a loading station for loading said hangers in said product carriers;
d) a buffer station for temporarily storing said hangers, including means for supporting and transporting said hangers to said loading station;
e) a carrier station for temporarily storing said product carriers, including means for supporting and transporting product carriers to said loading station;
f) means for inserting one of said hangers into said slot at said loading station so that said hanger engages said lock and is locked in said slot; and
g) control means for guiding the movement of said product carriers in said apparatus and for releasing said lock from said locking position to release said hanger from said product carriers at a predetermined point in said apparatus.

9. The apparatus of claim 8, further comprising identification means on said products, means for reading said identification means and means for storing information regarding said identification means for operating said control means.

10. The apparatus of claim 9, wherein said means for supporting and transporting said product carriers includes a first rail, said means for supporting and transporting said hangers includes a second rail, and said means for inserting said hangers includes lifting means for lifting said hangers into said slots.

11. The apparatus of claim 9, wherein said identification means is selected from the group consisting of a bar code and radio frequency identification.

12. The apparatus of claim 9, wherein said means for reading said identification means and said means for storing information regarding said identification means includes a computer.

13. The apparatus of claim 9, wherein said control means for guiding the movement of said product carriers in said apparatus and for releasing said lock from said locking position includes a computer.

14. The apparatus of claim 8, wherein said product carriers are marked with identification means, said means for reading said identification means comprises a person-operated interface, and said means for storing information regarding said identification means includes a computer in communication with said interface.

15. A method of transporting hangers, comprising the steps of transporting a product carrier to a loading station, said product carrier including a housing having a downwardly open slot for insertion of one of said hangers and a pivotable lock mounted in said slot and pivotable between a locking position and a release position, said pivotable lock spring-loaded in a locking position for locking said hanger in said slot, transporting said hanger from a buffer station to said loading station, and lifting said hanger into said slot so that said hanger is locked in said slot.

16. The method of claim 15, further comprising the steps of reading identification means on a product suspended from said hanger before transporting said hanger from said buffer station, and storing information regarding said identification means.

17. The method of claim 16, further comprising the steps of transporting said product carrier on a rail away from said loading station, controlling the movement of said product carrier including releasing said lock from said locking position to release said hanger from said product carrier at a predetermined point.

18. The method of claim 15, further comprising the steps of reading identification means on said product carrier before transporting said hanger from said buffer station and storing information regarding said identification means.

19. The method of claim 17, wherein said steps of reading, storing and controlling are performed by a computer.

20. The method of claim 18, further comprising the steps of transporting said product carrier on a rail away from said loading station, controlling the movement of said. product carriers including releasing said lock from said locking position to release said hanger from said product carrier at a predetermined point.

21. The method of claim 20, wherein said steps of reading, storing and controlling are performed by a computer.

* * * * *